United States Patent
Parvulescu et al.

(10) Patent No.: US 12,448,296 B2
(45) Date of Patent: Oct. 21, 2025

(54) OXIDIC MATERIAL COMPRISING A ZEOLITE HAVING FRAMEWORK TYPE AEI

(71) Applicant: BASF SE, Ludwigshafen am Rein (DE)

(72) Inventors: Andrei-Nicolae Parvulescu, Ludwigshafen (DE); Feng-Shou Xiao, Hangzhou (CN); Xiangju Meng, Hangzhou (CN); Qinming Wu, Hangzhou (CN); Yu Dai, Shanghai (CN); Stefan Maurer, Shanghai (CN); Ulrich Mueller, Ludwigshafen (DE); Hao Xu, Hangzhou (CN)

(73) Assignee: BASF SE, Ludwigshafen am Rein (DE)

( * ) Notice: Subject to any disclaimer, the term of this patent is extended or adjusted under 35 U.S.C. 154(b) by 125 days.

(21) Appl. No.: 17/423,590

(22) PCT Filed: Jan. 21, 2020

(86) PCT No.: PCT/CN2020/073611
§ 371 (c)(1),
(2) Date: Jul. 16, 2021

(87) PCT Pub. No.: WO2020/151721
PCT Pub. Date: Jul. 30, 2020

(65) Prior Publication Data
US 2022/0106192 A1    Apr. 7, 2022

(51) Int. Cl.
*C01B 39/48*    (2006.01)
(52) U.S. Cl.
CPC .......... *C01B 39/48* (2013.01); *C01P 2006/12* (2013.01)
(58) Field of Classification Search
None
See application file for complete search history.

(56) References Cited

U.S. PATENT DOCUMENTS

| | | | |
|---|---|---|---|
| 2016/0122192 A1* | 5/2016 | Dusselier | C01B 39/04 208/135 |
| 2016/0264428 A1 | 9/2016 | Moulton | |
| 2017/0128921 A1* | 5/2017 | Yang | C01B 39/48 |
| 2018/0250663 A1* | 9/2018 | Hotta | B01D 53/94 |

FOREIGN PATENT DOCUMENTS

| | | | | |
|---|---|---|---|---|
| CN | 107285334 | | 10/2017 | |
| CN | 107285334 A | | 10/2017 | |
| CN | 108584975 | | 9/2018 | |
| CN | 108584975 A | | 9/2018 | |
| EP | 3063093 | | 9/2016 | |
| EP | 3063093 A1 | | 9/2016 | |
| EP | 3222583 | | 9/2017 | |
| EP | 3222583 A1 | | 9/2017 | |
| EP | 3336060 | | 6/2018 | |
| EP | 3336060 A1 | | 6/2018 | |
| EP | 3616792 | * | 8/2018 | |
| GB | 2556291 | * | 5/2018 | |
| GB | 2556291 A | * | 5/2018 | ............. B01J 29/70 |
| JP | 2017036204 A | | 2/2017 | |
| JP | 2017210399 | * | 11/2017 | |
| JP | 2018087105 | * | 6/2018 | |
| WO | 2016080547 A1 | | 11/2015 | |
| WO | 2018059316 | * | 4/2018 | |
| WO | 2018210809 A1 | | 11/2018 | |

OTHER PUBLICATIONS

International Search Report for International Application No. PCT/CN2020/073611 mailed Apr. 9, 2020, 3 pgs.
Anonymous: "Zeolite YI Zeolyst International Zeolyst International", May 1, 2014, pp. 1-4, XP055959789, Retrieved from the Internet: URL:https://www.zeolyst.com/our-products/standard-zeolite-powders/zeolite-y.html.
International Preliminary Report on Patentability for International Application No. PCT/CN2020/073611 mailed Aug. 5, 2021, 8 pgs.

* cited by examiner

*Primary Examiner* — Sheng H Davis
(74) *Attorney, Agent, or Firm* — Lowenstein Sandler LLP

(57) ABSTRACT

A process for preparing an oxidic material comprising a zeolitic material having framework type AEI and a framework structure comprising a tetravalent element Y, a trivalent element X, and O, the process comprising preparing a synthesis mixture comprising water, a source of Y, a source of X comprising sodium, an AEI framework structure directing agent, and a source of sodium other than the source of X; and heating the synthesis mixture obtained from (i) to a temperature in the range of from 100 to 180° C. and keeping the synthesis mixture under autogenous pres-sure at a temperature in this range for a time in the range of at least 6 h, obtaining the oxidic material comprising a zeolitic material having framework type AEI and a framework structure comprising a tetravalent element Y, a trivalent element X, and O, comprised in its mother liquor; wherein the AEI framework structure directing agent according to (i) comprises a N, N-diethyl-2,6-dimethylpiperidinium cation.

19 Claims, 7 Drawing Sheets

OXIDIC MATERIAL COMPRISING A ZEOLITE HAVING FRAMEWORK TYPE AEI

Figure 1:
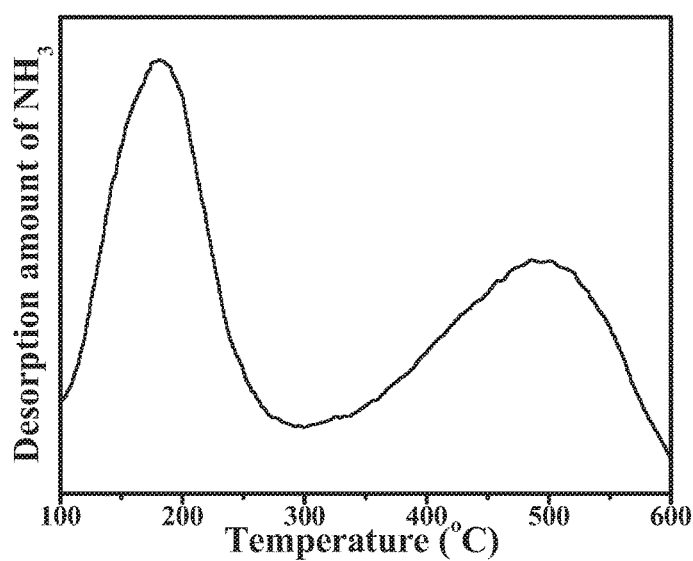

The present invention relates to a process for preparing an oxidic material comprising a zeolitic material having framework type AEI and a framework structure comprising a tetravalent element Y, a trivalent element X, and O, comprising preparing a synthesis mixture comprising water, a source of Y, a source of X comprising sodium, an AEI framework structure directing agent, and a source of sodium other than the source of X; and heating the synthesis mixture to a temperature in the range of from 100 to 180° C. and keeping the synthesis mixture under autogenous pressure at a temperature in this range. Further, the present invention relates to an oxidic material obtainable or obtained by said process. Yet further, the present invention relates to the use of said oxidic material preferably as a catalytically active material.

Zeolitic materials having framework type AEI are known to be potentially effective as catalysts or catalyst components for treating combustion exhaust gas in industrial applications, for example for converting nitrogen oxides ($NO_x$) in an exhaust gas stream or for the conversion of a C1 compound to one or more olefins. Synthetic AEI zeolitic materials may be prepared via zeolitic framework conversion according to which a starting material which is a suitable zeolitic material having a framework type other than AEI is suitably reacted to obtain the zeolitic material having framework type AEI. However, such a route is relatively costly due to the use of zeolites as the starting raw materials. An alternative approach is the preparation via precipitating crystals of the zeolitic material from a synthesis mixture which contains the sources of the elements from which the zeolitic framework is built, such as a source of silicon and a source of aluminum.

WO 2016/080547 A1 discloses a process for preparing AEI-type zeolites wherein along with the above mentioned sources of the elements from which the zeolitic framework is built, a sodium source is additionally employed therein by the addition of an alkali (sodium) source.

According to the present invention it was found that instead of employing, on the one hand, a source of a trivalent element such as Al, and on the other hand a source of sodium, it is possible to employ a source of a trivalent element which additionally contains sodium. Thus, at least a portion of the source of sodium of the prior art can be avoided.

Therefore, the present invention relates to a process for preparing an oxidic material comprising a zeolitic material having framework type AEI and a framework structure comprising a tetravalent element Y, a trivalent element X, and O, the process comprising
(i) preparing a synthesis mixture comprising water, a source of Y, a source of X comprising sodium, an AEI framework structure directing agent, and a source of sodium other than the source of X;
(ii) heating the synthesis mixture obtained from (i) to a temperature in the range of from 100 to 180° C. and keeping the synthesis mixture under autogenous pressure at a temperature in this range for a time in the range of at least 6 h, obtaining the oxidic material comprising a zeolitic material having framework type AEI and a framework structure comprising a tetravalent element Y, a trivalent element X, and O, comprised in its mother liquor;

wherein the AEI framework structure directing agent according to (i) comprises an N,N-dialkyldialkylpiperidinium cation;
wherein in the synthesis mixture prepared in (i) which is subjected to (ii), the molar ratio of the source of Y calculated as $YO_2$, relative to the source of X calculated as $X_2O_3$, defined as $YO_2:X_2O_3$, is at least 30:1;
wherein in the synthesis mixture prepared in (i) which is subjected to (ii), the molar ratio of sodium calculated as $Na_2O$, relative to the source of Y calculated as $YO_2$, defined as $Na_2O:YO_2$, is at least 0.23:1;
wherein Y is one or more of Si, Ge, S, Ti, and Zr;
wherein X is one or more of Al, B, Ga, and In.

It is preferred that the N,N-dialkyl-dialkylpiperidinium cation is an N,N—($C_1$-$C_3$)dialkyl-($C_1$-$C_3$)dialkylpiperidinium cation, more preferably an N,N—($C_1$-$C_2$)dialkyl-($C_1$-$C_2$)dialkylpiperidinium cations, wherein more preferably, the N,N-dialkyl-dialkylpiperidinium cation is selected from the group consisting of an N,N—($C_1$-$C_2$)dialkyl-2,6-($C_1$-$C_2$)dialkylpiperidinium cation, an N,N—($C_1$-$C_2$)dialkyl-3,5-($C_1$-$C_2$)dialkylpiperidinium cation and mixture of two or more thereof, more preferably selected from the group consisting of an N,N-dimethyl-2,6-($C_1$-$C_2$)dialkylpiperidinium cation, an N,N-dimethyl-3,5-($C_1$-$C_2$)dialkyl-piperidinium cation and a mixture of two or more thereof, more preferably selected from the group consisting of N,N-diethyl-2,6-dimethylpiperidinium cation, N,N-diethyl-3,5-dimethylpiperidinium cation and a mixture thereof, wherein more preferably, the N,N-dialkyl-dialkylpiperidinium cation comprises, more preferably consists of N,N-diethyl-2,6-dimethylpiperidinium cation, more preferably N,N-diethyl-cis-2,6-dimethylpiperidinium cation.

Preferably, the AEI framework structure directing agent according to (i) is a salt, more preferably one or more of a hydroxide and a halide, wherein the halide is preferably one or more of an iodide, a chloride, a fluoride and a bromide, wherein more preferably, the AEI framework structure directing agent according to (i) comprises, more preferably is, a hydroxide.

The AEI framework structure directing agent according to (i) preferably comprises, more preferably consists of, N,N-diethyl-2,6-dimethylpiperidinium hydroxide, more preferably N,N-diethylcis-2,6-dimethylpiperidinium hydroxide.

Preferably, Y comprises, more preferably is Si. Preferably, X comprises, more preferably is Al. More preferably, Y is Si and X is Al.

Generally, according to (i), any suitable source of the tetravalent element Y can be used. Preferably, the source of Y comprises one or more of a wet-process silica, a dry-process silica, and a colloidal silica. More preferably, the source of Y comprises, more preferably consists of, a colloidal silica.

Generally, according to (i), any suitable source of the trivalent element X can be used. Preferably, the source of X comprises a sodium aluminate, more preferably one or more $NaAlO_2$, $NaAl(OH)_4$, $Na_2O \cdot Al_2O_3$, $Na_2Al_2O_4$, $Na_5AlO_4$, $Na_7Al_3O_8$, $Na_{17}Al_5O_{16}$, and $NaAl_{11}O_{17}$. More preferably, the source of X comprises, more preferably consists of, $NaAlO_2$.

Preferably, the source of sodium other than the source of X comprises, more preferably consists of, NaOH.

It is preferred that the synthesis mixture prepared in (i) which is subjected to (ii) does not contain a zeolitic material having framework type FAU, more preferably does not contain a zeolitic material having a framework type other than AEI.

In the synthesis mixture prepared in (i) which is subjected to (ii), the molar ratio of the source of Y calculated as $YO_2$, relative to the source of X calculated as $X_2O_3$, defined as $YO_2:X_2O_3$, is preferably at least 40:1, more preferably at least 50:1, more preferably at least 60:1. Preferably, in the synthesis mixture prepared in (i) which is subjected to (ii), the molar ratio of the source of Y calculated as $YO_2$, relative to the source of X calculated as $X_2O_3$, defined as $YO_2:X_2O_3$, is in the range of from 30:1 to 600:1, more preferably in the range of from 40:1 to 500:1, more preferably in the range of from 50:1 to 300:1, more preferably in the range of from 60:1 to 150:1, more preferably in the range of from 60:1 to 100:1, more preferably in the range of from 60:1 to 80:1.

In the synthesis mixture prepared in (i) which is subjected to (ii), the molar ratio of the source of Y calculated as $YO_2$, relative to the AEI framework structure directing agent, defined as $YO_2:SDA$, is preferably in the range of from 1:1 to 14:1, more preferably in the range of from 2:1 to 12:1, more preferably in the range of from 4:1 to 10:1, more preferably in the range of from 7:1 to 9:1.

In the synthesis mixture prepared in (i) which is subjected to (ii), the molar ratio of the source of Y calculated as $YO_2$, relative to the water, defined as $YO_2$:water, is preferably in the range of from 0.01:1 to 1:1, more preferably in the range of from 0.01:1 to 0.5:1, more preferably in the range of from 0.01:1 to 0.1:1, more preferably in the range of from 0.01:1 to 0.05:1.

In the synthesis mixture prepared in (i) which is subjected to (ii), the molar ratio of sodium calculated as $Na_2O$, relative to the source of Y, calculated as $YO_2$, defined as $Na_2O:YO_2$, is preferably in the range of from 0.25:1 to 0.50:1, more preferably in the range of from 0.27:1 to 0.45:1, more preferably in the range of from 0.29:1 to 0.40:1, more preferably in the range of from 0.30:1 to 0.35:1.

In addition to the water, a source of Y, a source of X comprising sodium, an AEI framework structure directing agent, and a source of sodium other than the source of X, the synthesis mixture prepared in (i) may comprise one or more further additional components. Preferably, from 95 to 100 weight-%, more preferably from 98 to 100 weight-%, more preferably from 99 to 100 weight-% of the synthesis mixture prepared in (i) which is subjected to (ii) consist of water, the source of Y, the source of X comprising sodium, the AEI framework structure directing agent, and the source of sodium other than the source of X.

In the context of step (i) of the inventive process, the synthesis mixture prepared in (i) which is subjected to (ii) preferably further comprises a crystalline seed material comprising a zeolitic material having framework type AEI and a framework structure comprising the tetravalent element Y, the trivalent element X, and O.

Preferably, from 95 to 100 weight-%, preferably from 98 to 100 weight-%, more preferably from 99 to 100 weight-% of the synthesis mixture prepared in (i) which is subjected to (ii) consist of water, the source of Y, the source of X comprising sodium, the AEI framework structure directing agent, the source of sodium other than the source of X and the crystalline seed material.

Step (ii) of the inventive process comprises heating the synthesis mixture obtained from (i) to a temperature in the range of from 100 to 180° C. and keeping the synthesis mixture under autogenous pressure at a temperature in this range for a time in the range of at least 6 h. Preferably, (ii) is carried out in an autoclave. Preferably, the synthesis mixture prepared in (i) is heated to the temperature in (ii) with a heating rate in the range of from 0.5 to 4 K/min, more preferably in the range of from 1 to 3 K/min.

Preferably, the temperature according to (ii) is in the range of from 120 to 160° C., more preferably in the range of from 130 to 150° C.

Preferably, heating the synthesis mixture obtained from (i) in (ii) comprises agitating, preferably mechanically agitating, more preferably stirring the synthesis mixture. Preferably, according to (ii), the synthesis mixture is kept at the temperature for a time in the range of from 6 to 12 h, more preferably in the range of from 6 to 10 h, more preferably in the range of from 7 to 9 h.

Since step (ii) of the inventive process comprises heating the synthesis mixture obtained from (i) under autogenous pressure it is preferred (ii) further comprises depressurizing the mixture. Either before, during, or after depressurizing, the inventive process preferably further comprises (iii) cooling the mixture obtained from (ii), preferably to a temperature in the range of from 10 to 50° C., more preferably in the range of from 20 to 35° C.;

(iv) separating the oxidic material comprising a zeolitic material from the mixture obtained from (ii), said separating preferably comprising (iv.1) subjecting the mixture obtained from (ii) to a solid-liquid separation method, preferably comprising a filtration method or a spraying method;

(iv.2) preferably washing the oxidic material comprising a zeolitic material obtained from (iv.1);

(iv.3) preferably drying the oxidic material comprising a zeolitic material obtained from (iv.1) or from (iv.2), preferably from (iv.2), in a gas atmosphere having a temperature in the range of from 80 to 170° C., more preferably in the range of from 100 to 140° C., more preferably in the range of from 100 to 130° C.;

(v) preferably calcining the oxidic material comprising a zeolitic material obtained from (iv) in a gas atmosphere having a temperature in the range of from 400 to 600° C.;

wherein at least a portion of the mother liquor obtained according to (iv.1) from separating the oxidic material from the mixture obtained from (ii) is preferably recycled to (i) as part of the synthesis mixture prepared in (i).

Preferably, the gas atmosphere in (iv.3) comprises oxygen, more preferably is air, lean air, or synthetic air, and wherein the gas atmosphere in (v) comprises oxygen, more preferably is air, lean air, or synthetic air.

In the context of the inventive process, the oxidic material obtained comprising a zeolitic material having framework type AEI and a framework structure comprising a tetravalent element Y, a trivalent element X, and O, preferably exhibits one or both of the following characteristics (1) to (2), more preferably the following characteristics (1) to (2):

(1) a temperature programmed desorption of ammonia ($NH_3$-TPD) curve exhibiting a peak having its maximum at $(460\pm15)$ ° C., preferably $(460\pm10)$ ° C., more preferably $(460\pm5)$ ° C., and preferably a further peak having its maximum at $(175\pm15)$ ° C., preferably $(175\pm10)$ ° C., more preferably $(175\pm5)$ ° C., wherein the $NH_3$-TPD is determined as described in Reference Example 1.5 herein;

(2) a BET specific surface area in the range of from 550 to 700 $m^2/g$, preferably in the range of from 600 to 660 $m^2/g$, more preferably in the range of from 620 to 640 $m^2/g$, determined as described in Reference Example 1.2 herein.

The inventive process preferably further comprises (vi) subjecting the oxidic material comprising a zeolitic material obtained from (iv) or (v), more preferably from (v), to ion exchange conditions, more preferably ammonium exchange conditions, more preferably comprising bringing a solution comprising ammonium ions in contact with the oxidic material comprising a zeolitic material obtained from (iv) or (v), more preferably from (v), obtaining an oxidic material comprising a zeolitic material having framework type AEI in its ammonium form.

The solution comprising ammonium ions according to (vi) is preferably an aqueous solution comprising a dissolved ammonium salt, more preferably a dissolved inorganic ammonium salt, more preferably dissolved ammonium nitrate. Preferably, bringing the solution in contact with the oxidic material comprising a zeolitic material according to (vi) is repeated at least once, more preferably once or twice, more preferably once. Preferably, bringing the solution in contact with the oxidic material comprising a zeolitic material according to (vi) comprises one or more of impregnating the zeolitic material with the solution and spraying the solution onto the oxidic material comprising a zeolitic material, more preferably impregnating the oxidic material comprising a zeolitic material with the solution.

The inventive process preferably further comprises
(vii) calcining the oxidic material comprising zeolitic material obtained from (vi), obtaining an oxidic material comprising the zeolitic material in its H form.

Preferably, according to (vii), the oxidic material comprising a zeolitic material is calcined in a gas atmosphere having a temperature in the range of from 300 to 700° C., more preferably in the range of from 350 to 600° C., more preferably in the range of from 400 to 600° C. Preferably, the gas atmosphere comprises oxygen, more preferably is air, lean air, or synthetic air.

Depending on the intended use of the oxidic material comprising zeolitic material, the material, preferably obtained from (vii) can be employed as such. Further, it is conceivable that this oxidic material comprising zeolitic material is subjected to one or more further post-treatment steps. For example, the oxidic material comprising zeolitic material which is most preferably obtained as a powder can be suitably processed to a molding or a shaped body by any suitable method, including, but no restricted to, extruding, tabletting, spraying and the like. Preferably, the shaped body may have a rectangular, a triangular, a hexagonal, a square, an oval or a circular cross section, and/or preferably is in the form of a star, a tablet, a sphere, a cylinder, a strand, or a hollow cylinder. When preparing a shaped body, one or more binders can be used which may be chosen according to the intended use of the shaped body. Possible binder materials include, but are not restricted to, graphite, silica, titania, zirconia, alumina, and a mixed oxide of two or more of silicon, titanium and zirconium. The weight ratio of the oxidic material comprising zeolitic material relative to the binder is generally not subject to any specific restrictions and may be, for example, in the range of from 10:1 to 1:10. According to a further example according to which the oxidic material comprising zeolitic material is used, for example, as a catalyst or as a catalyst component for treating an exhaust gas stream, for example an exhaust gas stream of an engine, it is possible that the oxidic material comprising zeolitic material is used as a component of a washcoat to be applied onto a suitable substrate, such as a wall-flow filter or the like.

According to a preferred embodiment of the present invention, the oxidic material comprising a zeolitic material is subjected to a post-treatment which comprises supporting a metal M on the zeolitic material comprised in the oxidic material. Therefore, the present invention further preferably relates to the process as described above, further comprising (viii) supporting a metal M on the zeolitic material comprised in the oxidic material, preferably on the zeolitic material comprised in the oxidic material obtained from (vi) or (vii).

As to step (viii), it is preferred that (viii) comprises
(viii.1) preparing a mixture comprising the oxidic material comprising a zeolitic material, preferably the oxidic material comprising a zeolitic material obtained from (vi) or (vii), a source of a metal M, a solvent for the source of the metal M, and optionally an acid, preferably an organic acid, wherein the solvent preferably comprises water, the source of the metal M preferably comprises a salt of the metal M and the acid preferably comprises acetic acid;
(viii.2) heating the mixture prepared in (viii.1) to a temperature in the range of from 30 to 90° C., preferably in the range of from 40 to 80° C.;
(viii.3) preferably cooling, more preferably rapid-cooling the mixture obtained from (viii.2);
(viii.4) separating the oxidic material comprising a zeolitic material comprising the metal M from the mixture obtained from (viii.2) or (viii.3), preferably from (viii.3), the separating preferably comprising washing the oxidic material comprising a zeolitic material comprising the metal M;
(viii.5) preferably drying the oxidic material comprising a zeolitic material comprising the metal M obtained from (viii.4) in a gas atmosphere, preferably at a temperature of the gas atmosphere in the range of from 90 to 200° C., more preferably in the range of from 100 to 150° C., wherein the gas atmosphere preferably comprises oxygen;
(viii.6) preferably calcining the oxidic material comprising a zeolitic material comprising the metal M obtained from (viii.4) or (viii.5), preferably (viii.5), in a gas atmosphere, preferably at a temperature of the gas atmosphere in the range of from 350 to 600° C., more preferably in the range of from 450 to 600° C., wherein the gas atmosphere preferably comprises oxygen.

Regarding the metal M of step (viii), preferably the metal M is a transition metal of groups 7 to 12 of the periodic system of elements. More preferably, the metal M is one or more of Fe, Co, Ni, Cu, and Zn, more preferably one or more of Fe and Cu, wherein more preferably, the metal M comprises, more preferably is, Cu. Preferably, according to (viii), the metal M is supported on the zeolitic material in an amount in the range of from 0.1 to 15 weight-%, more preferably in the range of from 0.5 to 10 weight-%, more preferably in the range of from 1 to 7 weight-%, more preferably in the range of from 1.5 to 6 weight-%, more preferably in the range of from 2 to 3 weight-%, calculated as MO and based on the total weight of the zeolitic material.

Preferably, more than 50 weight-%, more preferably from 55 to 100 weight-%, more preferably from 60 to 100 weight-%, more preferably from 65 to 100 weight-%, more preferably from 70 to 100 weight-%, more preferably from 75 to 100 weight-%, more preferably from 80 to 100 weight-%, more preferably from 85 to 100 weight-%, more preferably from 90 to 100 weight-%, more preferably from 95 to 100 weight-%, more preferably from 98 to 100 weight-%, more preferably from 99 to 100 weight-% of the oxidic material obtained consist of the zeolitic material having framework type AEI optionally comprising Cu.

The present invention further relates to an oxidic material comprising a zeolitic material having framework type AEI and having a framework structure which comprises a tetravalent element Y, a trivalent element X, and O, obtainable or obtained or preparable or prepared by a process described herein above, wherein preferably more than 50 weight-%, more preferably from 55 to 100 weight-%, more preferably from 60 to 100 weight-%, more preferably from 65 to 100 weight-%, more preferably from 70 to 100 weight-%, more preferably from 75 to 100 weight-%, more preferably from 80 to 100 weight-%, more preferably from 85 to 100 weight-%, more preferably from 90 to 100 weight-%, more preferably from 95 to 100 weight-%, more preferably from 98 to 100 weight-%, more preferably from 99 to 100 weight-% of the oxidic material consist of the zeolitic material having framework type AEI, said oxidic material optionally comprising one or more further zeolitic materials having a framework type other than AEI and having a framework structure comprising a tetravalent element Y, a trivalent element X, and O, said further zeolitic material preferably having framework type MOR or ANA, wherein preferably from 95 to 100 weight-%, more preferably from 98 to 100 weight-%, more preferably from 99 to 100 weight-% of the oxidic material consist of the zeolitic material having framework type AEI and optionally the one or more zeolitic materials having a framework type other than AEI.

The present invention yet further relates to an oxidic material comprising a zeolitic material comprising a metal M, having framework type AEI and having a framework structure which comprises a tetravalent element Y, a trivalent element X, and O, obtainable or obtained or preparable or prepared by a process described herein above, wherein preferably more than 50 weight-%, more preferably from 55 to 100 weight-%, more preferably from 60 to 100 weight-%, more preferably from 65 to 100 weight-%, more preferably from 70 to 100 weight-%, more preferably from 75 to 100 weight-%, more preferably from 80 to 100 weight-%, more preferably from 85 to 100 weight-%, more preferably from 90 to 100 weight-%, more preferably from 95 to 100 weight-%, more preferably from 98 to 100 weight-%, more preferably from 99 to 100 weight-% of the oxidic material consist of the zeolitic material having framework type AEI comprising Cu, said oxidic material optionally comprising one or more further zeolitic materials having a framework type other than AEI and having a framework structure comprising a tetravalent element Y, a trivalent element X, and O, said further zeolitic material preferably having framework type MOR or ANA, wherein preferably from 95 to 100 weight-%, more preferably from 98 to 100 weight-%, more preferably from 99 to 100 weight-% of the oxidic material consist of the zeolitic material having framework type AEI and optionally the one or more zeolitic materials having a framework type other than AEI.

The present invention yet further relates to an oxidic material comprising a zeolitic material having framework type AEI and having a framework structure which comprises a tetravalent element Y, a trivalent element X, and O, said zeolitic material exhibiting a temperature programmed desorption of ammonia ($NH_3$-TPD) curve exhibiting a peak having its maximum at $(460\pm15)$ °C., preferably $(460\pm10)$ °C., more preferably $(460\pm5)$ °C., and preferably a further peak having its maximum at $(175\pm15)$ °C., preferably $(175\pm10)$ °C., more preferably $(175\pm5)$ °C., wherein the $NH_3$-TPD is determined as described in Reference Example 1.5 herein;
wherein Y is one or more of Si, Ge, S, Ti, and Zr;
wherein X is one or more of Al, B, Ga, and In;
wherein preferably more than 50 weight-%, more preferably from 55 to 100 weight-%, more preferably from 60 to 100 weight-%, more preferably from 65 to 100 weight-%, more preferably from 70 to 100 weight-%, more preferably from 75 to 100 weight-%, more preferably from 80 to 100 weight-%, more preferably from 85 to 100 weight-%, more preferably from 90 to 100 weight-%, more preferably from 95 to 100 weight-%, more preferably from 98 to 100 weight-%, more preferably from 99 to 100 weight-% of the oxidic material consist of the zeolitic material having framework type AEI, said oxidic material optionally comprising one or more further zeolitic materials having a framework type other than AEI and having a framework structure comprising a tetravalent element Y, a trivalent element X, and O, said further zeolitic material preferably having framework type MOR or ANA, wherein preferably from 95 to 100 weight-%, more preferably from 98 to 100 weight-%, more preferably from 99 to 100 weight-% of the oxidic material consist of the zeolitic material having framework type AEI and optionally the one or more zeolitic materials having a framework type other than AEI.

In the context of the oxidic material described herein above, preferably Y comprises, more preferably is Si. Preferably, X comprises, more preferably is Al. More preferably, Y is Si and X is Al.

In the framework structure of the zeolitic material having framework type AEI, the molar ratio of Y calculated as $YO_2$, relative to X calculated as $X_2O_3$, defined as $YO_2:X_2O_3$, preferably is at least 10:1. Preferably, in the framework structure of the zeolitic material having framework type AEI, the molar ratio of Y calculated as $YO_2$, relative to X calculated as $X_2O_3$, defined as $YO_2:X_2O_3$, is in the range of from 10:1 to 25:1, more preferably in the range of from 11:1 to 20:1, more preferably in the range of from 12:1 to 18:1.

The oxidic material preferably exhibits a BET specific surface area in the range of from 550 to 700 $m^2/g$, more preferably in the range of from 600 to 660 $m^2/g$, more preferably in the range of from 620 to 640 $m^2/g$, determined as described in Reference Example 1.2 herein. Preferably, from 95 to 100 weight-%, preferably from 98 to 100 weight-%, more preferably from 99 to 100 weight-% of the zeolitic material having framework type AEI consist of Y, X, O, optionally H. Preferably, the oxidic material is obtainable or obtained or preparable or prepared by a process described herein above.

The oxidic material preferably further comprises a metal M which is preferably a transition metal of groups 7 to 12 of the periodic system of elements, more preferably one or more of Fe, Co, Ni, Cu, and Zn, more preferably one or more of Fe and Cu, wherein more preferably, the metal M comprises, more preferably is Cu. Generally, it may be conceivable that the metal M comprises noble metals, more preferably platinum group metals, more preferably the metal M comprises Pd and/or Pt. Preferably, the metal M is comprised in an amount in the range of from 0.1 to 15 weight-%, more preferably in the range of from 0.5 to 10 weight-%, more preferably in the range of from 1 to 7 weight-%, more preferably in the range of from 1.5 to 6 weight-%, more preferably in the range of from 2 to 3 weight-%, calculated as MO and based on the total weight of the oxidic material, wherein the metal M is preferably comprised in the zeolitic material comprised in the oxidic material. Preferably, from 95 to 100 weight-%, more preferably from 98 to 100 weight-%, more preferably from 99 to 100 weight-% of the zeolitic material having framework type AEI comprised in the oxidic material consist of Y, X, O, the metal M, and optionally H. Preferably, the oxidic material comprising a zeolitic material comprising a metal M is obtainable or obtained or preparable or prepared by a process described herein above.

The oxidic material comprising a zeolitic material of the present invention having framework type AEI and having a framework structure which comprises a tetravalent element Y, a trivalent element X, and O can be used for any conceivable purpose, including, but not limited to, an absorbent, a molecular sieve, a catalytically active material, a catalyst, or a catalyst component, more preferably as a catalytically active material, a catalyst, or a catalyst component. Preferably, the oxidic material comprising a zeolitic material of the present invention is used for the conversion of a C1 compound to one or more olefins, more preferably for the conversion of methanol to one or more olefins or for the conversion of a synthetic gas comprising carbon monoxide and hydrogen to one or more olefins. Further, the oxidic material comprising a zeolitic material of the present invention can be used in dehydrogenation. Preferably, the oxidic material for said use described above is the oxidic material obtainable or obtained or preparable or prepared by a process described herein above, or the oxidic material for said use described above is the oxidic material exhibiting a temperature programmed desorption of ammonia ($NH_3$-TPD) curve as defined herein above, obtainable or obtained or preparable or prepared by a process described herein above. More preferably, the oxidic material comprising a zeolitic material of the present invention is used for the selective catalytic reduction of nitrogen oxides in an exhaust gas stream, more preferably an exhaust gas stream from a diesel engine. Preferably, the oxidic material for said use described above is the oxidic material comprising a zeolitic material comprising a metal M obtainable or obtained or preparable or prepared by a process described herein above.

The present invention also relates to a method for catalytically converting a C1 compound to one or more olefins, preferably converting methanol to one or more olefins or converting a synthetic gas comprising carbon monoxide and hydrogen to one or more olefins, said method comprising bringing said C1 compound in contact with a catalyst comprising the oxidic material according to the present invention. Preferably, the oxidic material employed in said method is the oxidic material obtainable or obtained or preparable or prepared by a process described herein above, or the oxidic material employed in said method is the oxidic material exhibiting a temperature programmed desorption of ammonia ($NH_3$-TPD) curve as defined herein above, obtainable or obtained or preparable or prepared by a process described herein above.

The present invention also relates to a method for catalytically converting a C1 compound to one or more olefins, preferably converting methanol to one or more olefins or converting a synthetic gas comprising carbon monoxide and hydrogen to one or more olefins, said method comprising preparing an oxidic material comprising a zeolitic material having framework type AEI and having a framework structure which comprises a tetravalent element Y, a trivalent element X, and O by a process according to the present invention and bringing said C1 compound in contact with a catalyst comprising said oxidic material. Preferably, said method comprises preparing an oxidic material comprising a zeolitic material having framework type AEI and having a framework structure which comprises a tetravalent element Y, a trivalent element X, and O by a process according to the present invention which comprises (i) and (ii), preferably further comprising one or more of (iii) to (vii) as defined herein above for the inventive process, and bringing said C1 compound in contact with a catalyst comprising said oxidic material.

The present invention further relates to a method for selectively catalytically reducing nitrogen oxides in an exhaust gas stream, preferably an exhaust gas stream from a diesel engine, said method comprising bringing said exhaust gas stream in contact with a catalyst comprising the oxidic material according to the present invention. Preferably, the oxidic material employed in said method is the oxidic material comprising a zeolitic material comprising a metal M is obtainable or obtained or preparable or prepared by a process described herein above.

The present invention yet further relates to a method for selectively catalytically reducing nitrogen oxides in an exhaust gas stream, preferably an exhaust gas stream from a diesel engine, said method comprising preparing an oxidic material comprising a zeolitic material having framework type AEI and having a framework structure which comprises a tetravalent element Y, a trivalent element X, and O by a process according to the present invention, and bringing said exhaust gas stream in contact with a catalyst comprising said oxidic material. Preferably, said method comprises preparing an oxidic material comprising a zeolitic material having framework type AEI and having a framework structure, a tetravalent element Y, a trivalent element X, and O by a process according to the present invention which comprises supporting a metal M on the zeolitic material comprised in the oxidic material according to (viii), and bringing said exhaust gas stream in contact with a catalyst comprising said oxidic material.

Further, the present invention relates to a catalyst, preferably a catalyst for selectively catalytically reducing nitrogen oxides in an exhaust gas stream, preferably an exhaust gas stream from a diesel engine, or for catalytically converting a C1 compound to one or more olefins, preferably converting methanol to one or more olefins or converting a synthetic gas comprising carbon monoxide and hydrogen to one or more olefins, said catalyst comprising the oxidic material according to the present invention.

The present invention is further illustrated by the following embodiments and combinations of embodiments as indicated by the respective dependencies and back-references. In particular, it is noted that in each instance where a range of embodiments is mentioned, for example in the context of a term such as "The process of any of embodiments 1 to 4", every embodiment in this range is meant to be explicitly disclosed for the skilled person, i.e. the wording of this term is to be understood by the skilled person as being synonymous to "The process of any of embodiments 1, 2, 3, and 4".

1. A process for preparing an oxidic material comprising a zeolitic material having framework type AEI and a framework structure comprising a tetravalent element Y, a trivalent element X, and O, the process comprising
   (i) preparing a synthesis mixture comprising water, a source of Y, a source of X comprising sodium, an AEI framework structure directing agent, and a source of sodium other than the source of X;
   (ii) heating the synthesis mixture obtained from (i) to a temperature in the range of from 100 to 180° C. and keeping the synthesis mixture under autogenous pressure at a temperature in this range for a time in the range of at least 6 h, obtaining the oxidic material comprising a zeolitic material having framework type AEI and a framework structure comprising a tetravalent element Y, a trivalent element X, and O, comprised in its mother liquor;
   wherein the AEI framework structure directing agent according to (i) comprises an N,N-dialkyl-dialkylpiperidinium cation;
   wherein in the synthesis mixture prepared in (i) which is subjected to (ii), the molar ratio of the source of Y calculated as YO$_2$, relative to the source of X calculated as X$_2$O$_3$, defined as YO$_2$:X$_2$O$_3$, is at least 30:1;

wherein in the synthesis mixture prepared in (i) which is subjected to (ii), the molar ratio of sodium calculated as Na$_2$O, relative to the source of Y calculated as YO$_2$, defined as Na$_2$O:YO$_2$, is at least 0.23:1;

wherein Y is one or more of Si, Ge, S, Ti, and Zr;

wherein X is one or more of Al, B, Ga, and In.

2. The process of embodiment 1, wherein the N,N-dialkyl-dialkylpiperidinium cation is an N,N—(C$_1$-C$_3$)dialkyl-(C$_1$-C$_3$)dialkylpiperidinium cation, preferably an N,N—(C$_1$-C$_2$)dialkyl-(C$_1$-C$_2$)dialkylpiperidinium cations, wherein more preferably, the N,N-dialkyl-dialkylpiperidinium cation is selected from the group consisting of an N,N—(C$_1$-C$_2$)dialkyl-2,6-(C$_1$-C$_2$)dialkylpiperidinium cation, an N,N—(C$_1$-C$_2$)dialkyl-3,5-(C$_1$-C$_2$)dialkylpiperidinium cation and mixture of two or more thereof, more preferably selected from the group consisting of an N,N-dimethyl-2,6-(C$_1$-C$_2$)dialkylpiperidinium cation, an N,N-dimethyl-3,5-(C$_1$-C$_2$)dialkylpiperidinium cation and a mixture of two or more thereof, more preferably selected from the group consisting of N,N-diethyl-2,6-dimethylpiperidinium cation, N,N-diethyl-3,5-dimethylpiperidinium cation and a mixture thereof, wherein more preferably, the N,N-dialkyl-dialkylpiperidinium cation comprises, more preferably consists of N,N-diethyl-2,6-dimethylpiperidinium cation, more preferably N,N-diethyl-cis-2,6-dimethylpiperidinium cation.

3. The process of embodiment 1 or 2, wherein the AEI framework structure directing agent according to (i) is a salt, preferably one or more of a hydroxide and a halide, wherein the halide is preferably one or more of an iodide, a chloride, a fluoride and a bromide, wherein more preferably, the AEI framework structure directing agent according to (i) comprises, more preferably is, a hydroxide.

4. The process of any one of embodiments 1 to 3, wherein the AEI framework structure directing agent according to (i) comprises, preferably consists of, N,N-diethyl-2,6-dimethylpiperidinium hydroxide, preferably N,N-diethyl-cis-2,6-dimethylpiperidinium hydroxide.

5. The process of any one of embodiments 1 to 4, wherein Y comprises, preferably is Si.

6. The process of any one of embodiments 1 to 5, wherein X comprises, preferably is Al.

7. The process of any one of embodiments 1 to 6, wherein Y is Si and X is Al.

8. The process of any one of embodiments 1 to 7, wherein the source of Y comprises one or more of a wet-process silica, a dry-process silica, and a colloidal silica.

9. The process of embodiment 8, wherein the source of Y comprises, preferably consists of, a colloidal silica.

10. The process of any one of embodiments 1 to 9, wherein the source of X comprises a sodium aluminate, preferably one or more NaAlO$_2$, NaAl(OH)$_4$, Na$_2$O.Al$_2$O$_3$, Na$_2$Al$_2$O$_4$, Na$_5$AlO$_4$, Na$_7$Al$_3$O$_8$, Na$_{17}$Al$_5$O$_{16}$, and NaAl$_{11}$O$_{17}$.

11. The process of any one of embodiments 1 to 10, wherein the source of X comprises, preferably consists of, NaAlO$_2$.

12. The process of any one of embodiments 1 to 11, wherein the source of sodium other than the source of X comprises, preferably consists of, NaOH.

13. The process of any one of embodiments 1 to 12, the synthesis mixture prepared in (i) which is subjected to (ii) does not contain a zeolitic material having framework type FAU, preferably does not contain a zeolitic material having a framework type other than AEI.

14. The process of any one of embodiments 1 to 13, wherein in the synthesis mixture prepared in (i) which is subjected to (ii), the molar ratio of the source of Y calculated as YO$_2$, relative to the source of X calculated as X$_2$O$_3$, defined as YO$_2$:X$_2$O$_3$, is at least 40:1, preferably at least 50:1, more preferably at least 60:1.

15. The process of embodiment 14, wherein in the synthesis mixture prepared in (i) which is subjected to (ii), the molar ratio of the source of Y calculated as YO$_2$, relative to the source of X calculated as X$_2$O$_3$, defined as YO$_2$:X$_2$O$_3$, is in the range of from 30:1 to 600:1, preferably in the range of from 40:1 to 500:1, more preferably in the range of from 50:1 to 300:1, more preferably in the range of from 60:1 to 150:1, more preferably in the range of from 60:1 to 100:1, more preferably in the range of from 60:1 to 80:1.

16. The process of any one of embodiments 1 to 15, wherein in the synthesis mixture prepared in (i) which is subjected to (ii), the molar ratio of the source of Y calculated as YO$_2$, relative to the AEI framework structure directing agent, defined as YO$_2$:SDA, is in the range of from 1:1 to 14:1, preferably in the range of from 2:1 to 12:1, more preferably in the range of from 4:1 to 10:1, more preferably in the range of from 7:1 to 9:1.

17. The process of any one of embodiments 1 to 16, wherein in the synthesis mixture prepared in (i) which is subjected to (ii), the molar ratio of the source of Y calculated as YO$_2$, relative to the water, defined as YO$_2$:water, is in the range of from 0.01:1 to 1:1, preferably in the range of from 0.01:1 to 0.5:1, more preferably in the range of from 0.01:1 to 0.1:1, more preferably in the range of from 0.01:1 to 0.05:1.

18. The process of any one of embodiments 1 to 17, wherein in the synthesis mixture prepared in (i) which is subjected to (ii), the molar ratio of sodium calculated as Na$_2$O, relative to the source of Y, calculated as YO$_2$, defined as Na$_2$O:YO$_2$, is in the range of from 0.25:1 to 0.50:1, preferably in the range of from 0.27:1 to 0.45:1, more preferably in the range of from 0.29:1 to 0.40:1, more preferably in the range of from 0.30:1 to 0.35:1.

19. The process of any one of embodiments 1 to 18, wherein from 95 to 100 weight-%, preferably from 98 to 100 weight-%, more preferably from 99 to 100 weight-% of the synthesis mixture prepared in (i) which is subjected to (ii) consist of water, the source of Y, the source of X comprising sodium, the AEI framework structure directing agent, and the source of sodium other than the source of X.

20. The process of any one of embodiments 1 to 19, wherein the synthesis mixture prepared in (i) which is subjected to (ii) further comprises a crystalline seed material comprising a zeolitic material having framework type AEI and a framework structure comprising the tetravalent element Y, the trivalent element X, and O.

21. The process of any one of embodiments 1 to 20, wherein from 95 to 100 weight-%, preferably from 98 to 100 weight-%, more preferably from 99 to 100 weight-% of the synthesis mixture prepared in (i) which is subjected to (ii) consist of water, the source of Y, the source of X comprising sodium, the AEI framework structure directing agent, the source of sodium other than the source of X and the crystalline seed material.

22. The process according to any one of embodiments 1 to 21, wherein (ii) is carried out in an autoclave.

23. The process of any one of embodiments 1 to 22, wherein the synthesis mixture prepared in (i) is heated to the temperature in (ii) with a heating rate in the range of from 0.5 to 4 K/min, preferably in the range of from 1 to 3 K/min.
24. The process of any one of embodiments 1 to 23, wherein the temperature according to (ii) is in the range of from 120 to 160° C., preferably in the range of from 130 to 150° C.
25. The process of any one of embodiments 1 to 24, wherein according to (ii), the synthesis mixture is agitated, preferably mechanically agitated, more preferably stirred.
26. The process of any one of embodiments 1 to 25, wherein according to (ii), the synthesis mixture is kept at the temperature for a time in the range of from 6 to 12 h, preferably in the range of from 6 to 10 h, more preferably in the range of from 7 to 9 h.
27. The process of any one of embodiments 1 to 26, further comprising
    (iii) cooling the mixture obtained from (ii), preferably to a temperature in the range of from 10 to 50° C., more preferably in the range of from 20 to 35° C.;
    (iv) separating the oxidic material comprising a zeolitic material from the mixture obtained from (ii), said separating preferably comprising
        (iv.1) subjecting the mixture obtained from (ii) to a solid-liquid separation method, preferably comprising a filtration method or a spraying method;
        (iv.2) preferably washing the oxidic material comprising a zeolitic material obtained from (iv.1);
        (iv.3) preferably drying the oxidic material comprising a zeolitic material obtained from (iv.1) or from (iv.2), preferably from (iv.2), in a gas atmosphere having a temperature in the range of from 80 to 170° C., preferably in the range of from 100 to 140° C., more preferably in the range of from 100 to 130° C.;
    (v) preferably calcining the oxidic material comprising a zeolitic material obtained from (iv) in a gas atmosphere having a temperature in the range of from 400 to 600° C.; wherein at least a portion of the mother liquor obtained according to (iv.1) from separating the oxidic material from the mixture obtained from (ii) is preferably recycled to (i) as part of the synthesis mixture prepared in (i).
28. The process of embodiment 27, wherein the gas atmosphere in (iv.3) comprises oxygen, preferably is air, lean air, or synthetic air, and wherein the gas atmosphere in (v) comprises oxygen, preferably is air, lean air, or synthetic air.
29. The process of any one of embodiments 1 to 28, preferably according to embodiment 27 or 28, wherein the oxidic material comprising a zeolitic material having framework type AEI and a framework structure comprising a tetravalent element Y, a trivalent element X, and O exhibits one or both of the following characteristics (1) to (2), preferably the following characteristics (1) to (2):
    (1) a temperature programmed desorption of ammonia ($NH_3$-TPD) curve exhibiting a peak having its maximum at (460±15) ° C., preferably (460±10) ° C., more preferably (460±5) ° C., and preferably a further peak having its maximum at (175±15) ° C., preferably (175±10) ° C., more preferably (175±5) ° C., wherein the $NH_3$-TPD is determined as described in Reference Example 1.5 herein;
    (2) a BET specific surface area in the range of from 550 to 700 $m^2$/g, preferably in the range of from 600 to 660 $m^2$/g, more preferably in the range of from 620 to 640 $m^2$/g, determined as described in Reference Example 1.2 herein.
30. The process of any one of embodiments 27 to 29, further comprising
    (vi) subjecting the oxidic material comprising a zeolitic material obtained from (iv) or (v), preferably from (v), to ion exchange conditions, preferably ammonium exchange conditions, more preferably comprising bringing a solution comprising ammonium ions in contact with the oxidic material comprising a zeolitic material obtained from (iv) or (v), preferably from (v), obtaining an oxidic material comprising a zeolitic material having framework type AEI in its ammonium form.
31. The process of embodiment 30, wherein the solution comprising ammonium ions according to (vi) is an aqueous solution comprising a dissolved ammonium salt, preferably a dissolved inorganic ammonium salt, more preferably dissolved ammonium nitrate.
32. The process of embodiment 30 or 31, wherein bringing the solution in contact with the oxidic material comprising a zeolitic material according to (vi) is repeated at least once, preferably once or twice, more preferably once.
33. The process of any one of embodiments 30 to 32, wherein bringing the solution in contact with the oxidic material comprising a zeolitic material according to (vi) comprises one or more of impregnating the zeolitic material with the solution and spraying the solution onto the oxidic material comprising a zeolitic material, preferably impregnating the oxidic material comprising a zeolitic material with the solution.
34. The process of any one of embodiments 30 to 33, further comprising
    (vii) calcining the oxidic material comprising zeolitic material obtained from (vi), obtaining an oxidic material comprising the zeolitic material in its H form.
35. The process of embodiment 34, wherein according to (vii), the oxidic material comprising a zeolitic material is calcined in a gas atmosphere having a temperature in the range of from 300 to 700° C., preferably in the range of from 350 to 600° C., more preferably in the range of from 400 to 600° C.
36. The process of embodiment 35, wherein the gas atmosphere comprises oxygen, preferably is air, lean air, or synthetic air.
37. The process of any one of embodiments 1 to 36, preferably any one of embodiments 33 to 36, more preferably any one of embodiments 30 to 33, further comprising
    (viii) supporting a metal M on the zeolitic material comprised in the oxidic material, preferably on the zeolitic material comprised in the oxidic material obtained from (vi) or (vii).
38. The process of embodiment 37, wherein (viii) comprises
    (viii.1) preparing a mixture comprising the oxidic material comprising a zeolitic material, preferably the oxidic material comprising a zeolitic material obtained from (vi) or (vii), a source of a metal M, a solvent for the source of the metal M, and optionally an acid, preferably an organic acid, wherein the solvent preferably comprises water, the source of the metal M preferably comprises a salt of the metal M and the acid preferably comprises acetic acid;
    (viii.2) heating the mixture prepared in (viii.1) to a temperature in the range of from 30 to 90° C., preferably in the range of from 40 to 80° C.;

(viii.3) preferably cooling, more preferably rapid-cooling the mixture obtained from (viii.2);

(viii.4) separating the oxidic material comprising a zeolitic material comprising the metal M from the mixture obtained from (viii.2) or (viii.3), preferably from (viii.3), the separating preferably comprising washing the oxidic material comprising a zeolitic material comprising the metal M;

(viii.5) preferably drying the oxidic material comprising a zeolitic material comprising the metal M obtained from (viii.4) in a gas atmosphere, preferably at a temperature of the gas atmosphere in the range of from 90 to 200° C., more preferably in the range of from 100 to 150° C., wherein the gas atmosphere preferably comprises oxygen;

(viii.6) preferably calcining the oxidic material comprising a zeolitic material comprising the metal M obtained from (viii.4) or (viii.5), preferably (viii.5), in a gas atmosphere, preferably at a temperature of the gas atmosphere in the range of from 350 to 600° C., more preferably in the range of from 450 to 600° C., wherein the gas atmosphere preferably comprises oxygen.

39. The process of embodiment 37 or 38, wherein the metal M is a transition metal of groups 7 to 12 of the periodic system of elements.

40. The process of embodiment 39, wherein the metal M is one or more of Fe, Co, Ni, Cu, and Zn, preferably one or more of Fe and Cu, wherein more preferably, the metal M comprises, more preferably is, Cu.

41. The process of any one of embodiments 37 to 40, wherein according to (viii), the metal M is supported on the zeolitic material in an amount in the range of from 0.1 to 15 weight-%, preferably in the range of from 0.5 to 10 weight-%, more preferably in the range of from 1 to 7 weight-%, more preferably in the range of from 1.5 to 6 weight-%, more preferably in the range of from 2 to 3 weight-%, calculated as MO and based on the total weight of the zeolitic material.

42. The process of any one of embodiments 1 to 41, wherein more than 50 weight-%, preferably from 55 to 100 weight-%, more preferably from 60 to 100 weight-%, more preferably from 65 to 100 weight-%, more preferably from 70 to 100 weight-%, more preferably from 75 to 100 weight-%, more preferably from 80 to 100 weight-%, more preferably from 85 to 100 weight-%, more preferably from 90 to 100 weight-%, more preferably from 95 to 100 weight-%, more preferably from 98 to 100 weight-%, more preferably from 99 to 100 weight-% of the oxidic material obtained consist of the zeolitic material having framework type AEI optionally comprising Cu.

43. An oxidic material comprising a zeolitic material having framework type AEI and having a framework structure which comprises a tetravalent element Y, a trivalent element X, and O, obtainable or obtained or preparable or prepared by a process according to any one of embodiments 1 to 36, wherein preferably more than 50 weight-%, more preferably from 55 to 100 weight-%, more preferably from 60 to 100 weight-%, more preferably from 65 to 100 weight-%, more preferably from 70 to 100 weight-%, more preferably from 75 to 100 weight-%, more preferably from 80 to 100 weight-%, more preferably from 85 to 100 weight-%, more preferably from 90 to 100 weight-%, more preferably from 95 to 100 weight-%, more preferably from 98 to 100 weight-%, more preferably from 99 to 100 weight-% of the oxidic material consist of the zeolitic material having framework type AEI, said oxidic material optionally comprising one or more further zeolitic materials having a framework type other than AEI and having a framework structure comprising a tetravalent element Y, a trivalent element X, and O, said further zeolitic material preferably having framework type MOR or ANA, wherein preferably from 95 to 100 weight-%, more preferably from 98 to 100 weight-%, more preferably from 99 to 100 weight-% of the oxidic material consist of the zeolitic material having framework type AEI and optionally the one or more zeolitic materials having a framework type other than AEI.

44. An oxidic material comprising a zeolitic material comprising a metal M, having framework type AEI and having a framework structure which comprises a tetravalent element Y, a trivalent element X, and O, obtainable or obtained or preparable or prepared by a process according to any one of embodiments 37 to 42, wherein preferably more than 50 weight-%, more preferably from 55 to 100 weight-%, more preferably from 60 to 100 weight-%, more preferably from 65 to 100 weight-%, more preferably from 70 to 100 weight-%, more preferably from 75 to 100 weight-%, more preferably from 80 to 100 weight-%, more preferably from 85 to 100 weight-%, more preferably from 90 to 100 weight-%, more preferably from 95 to 100 weight-%, more preferably from 98 to 100 weight-%, more preferably from 99 to 100 weight-% of the oxidic material consist of the zeolitic material having framework type AEI comprising Cu, said oxidic material optionally comprising one or more further zeolitic materials having a framework type other than AEI and having a framework structure comprising a tetravalent element Y, a trivalent element X, and O, said further zeolitic material preferably having framework type MOR or ANA, wherein preferably from 95 to 100 weight-%, more preferably from 98 to 100 weight-%, more preferably from 99 to 100 weight-% of the oxidic material consist of the zeolitic material having framework type AEI and optionally the one or more zeolitic materials having a framework type other than AEI.

45. An oxidic material comprising a zeolitic material having framework type AEI and having a framework structure which comprises a tetravalent element Y, a trivalent element X, and O, said zeolitic material exhibiting a temperature programmed desorption of ammonia ($NH_3$-TPD) curve exhibiting a peak having its maximum at $(460\pm15)$ ° C., preferably $(460\pm10)$ ° C., more preferably $(460\pm5)$ ° C., and preferably a further peak having its maximum at $(175\pm15)$ ° C., preferably $(175\pm10)$ ° C., more preferably $(175\pm5)$ ° C., wherein the $NH_3$-TPD is determined as described in Reference Example 1.5 herein;

wherein Y is one or more of Si, Ge, S, Ti, and Zr;
wherein X is one or more of Al, B, Ga, and In;
wherein preferably more than 50 weight-%, more preferably from 55 to 100 weight-%, more preferably from 60 to 100 weight-%, more preferably from 65 to 100 weight-%, more preferably from 70 to 100 weight-%, more preferably from 75 to 100 weight-%, more preferably from 80 to 100 weight-%, more preferably from 85 to 100 weight-%, more preferably from 90 to 100 weight-%, more preferably from 95 to 100 weight-%, more preferably from 98 to 100 weight-%, more preferably from 99 to 100 weight-% of the oxidic material consist of the zeolitic material having framework type AEI, said oxidic material optionally comprising one or more further zeolitic materials having a framework type other than AEI and having a framework structure comprising a tetravalent element Y, a trivalent element X, and O, said further zeolitic material preferably having framework type MOR or ANA, wherein preferably from 95 to 100 weight-%, more preferably from 98 to 100 weight-%, more preferably from 99 to 100 weight-% of the oxidic material consist of the zeolitic material having framework type AEI and optionally the one or more zeolitic materials having a framework type other than AEI.

46. The oxidic material of embodiment 45, wherein Y comprises, preferably is Si.

47. The oxidic material of embodiment 45 or 46, wherein X comprises, preferably is Al.

48. The oxidic material of any one of embodiments 45 to 47, wherein Y is Si and X is Al.

49. The oxidic material of any one of embodiments 45 to 48, wherein in the framework structure of the zeolitic material having framework type AEI, the molar ratio of Y calculated as $YO_2$, relative to X calculated as $X_2O_3$, defined as $YO_2:X_2O_3$, is at least 10:1.

50. The oxidic material of embodiment 49, wherein in the framework structure of the zeolitic material having framework type AEI, the molar ratio of Y calculated as $YO_2$, relative to X calculated as $X_2O_3$, defined as $YO_2:X_2O_3$, is in the range of from 10:1 to 25:1, preferably in the range of from 11:1 to 20:1, more preferably in the range of from 12:1 to 18:1.

51. The oxidic material of any one of embodiments 45 to 50, exhibiting a BET specific surface area in the range of from 550 to 700 $m^2/g$, preferably in the range of from 600 to 660 $m^2/g$, more preferably in the range of from 620 to 640 $m^2/g$, determined as described in Reference Example 1.2 herein.

52. The oxidic material of any one of embodiments 45 to 51, wherein from 95 to 100 weight-%, preferably from 98 to 100 weight-%, more preferably from 99 to 100 weight-% of the zeolitic material having framework type AEI consist of Y, X, O, optionally H.

53. The oxidic material of any one of embodiments 45 to 52, being the oxidic material according to embodiment 43.

54. The oxidic material of any one of embodiments 45 to 51, further comprising a metal M which is preferably a transition metal of groups 7 to 12 of the periodic system of elements, more preferably one or more of Fe, Co, Ni, Cu, and Zn, more preferably one or more of Fe and Cu, wherein more preferably, the metal M comprises, more preferably is Cu.

55. The oxidic material of embodiment 54, comprising the metal M in an amount in the range of from 0.1 to 15 weight-%, preferably in the range of from 0.5 to 10 weight-%, more preferably in the range of from 1 to 7 weight-%, more preferably in the range of from 1.5 to 6 weight-%, more preferably in the range of from 2 to 3 weight-%, calculated as MO and based on the total weight of the oxidic material, wherein the metal M is preferably comprised in the zeolitic material comprised in the oxidic material.

56. The oxidic material of embodiment 54 or 55, wherein from 95 to 100 weight-%, preferably from 98 to 100 weight-%, more preferably from 99 to 100 weight-% of the zeolitic material having framework type AEI comprised in the oxidic material consist of Y, X, O, the metal M, and optionally H.

57. The oxidic material of any one of embodiments 54 to 56, being the oxidic material according to embodiment 44.

58. Use of an oxidic material according to any one of embodiments 43 to 57 as an adsorbent, a molecular sieve, a catalytically active material, a catalyst, or a catalyst component, preferably as a catalytically active material, a catalyst, or a catalyst component.

59. The use of embodiment 58 for the conversion of a C1 compound to one or more olefins, preferably for the conversion of methanol to one or more olefins or for the conversion of a synthetic gas comprising carbon monoxide and hydrogen to one or more olefins.

60. The use of embodiment 59, wherein the oxidic material is the oxidic material according to embodiment 43 or any one of embodiments 45 to 53.

61. The use of embodiment 58 for the selective catalytic reduction of nitrogen oxides in an exhaust gas stream, preferably an exhaust gas stream from a diesel engine.

62. The use of embodiment 61, wherein the oxidic material is the oxidic material according to embodiment 44 or any one of embodiments 54 to 57.

63. A method for catalytically converting a C1 compound to one or more olefins, preferably converting methanol to one or more olefins or converting a synthetic gas comprising carbon monoxide and hydrogen to one or more olefins, said method comprising bringing said C1 compound in contact with a catalyst comprising the oxidic material according to any one of embodiments 43 to 57.

64. The method of embodiment 63, wherein the oxidic material is the oxidic material according to embodiment 43 or any one of embodiments 45 to 53.

65. A method for catalytically converting a C1 compound to one or more olefins, preferably converting methanol to one or more olefins or converting a synthetic gas comprising carbon monoxide and hydrogen to one or more olefins, said method comprising preparing an oxidic material comprising a zeolitic material having framework type AEI and having a framework structure which comprises a tetravalent element Y, a trivalent element X, and O by a process according to any one of embodiments 1 to 42 and bringing said C1 compound in contact with a catalyst comprising said oxidic material.

66. The method of embodiment 65, said method comprising preparing an oxidic material comprising a zeolitic material having framework type AEI and having a framework structure which comprises a tetravalent element Y, a trivalent element X, and O by a process according to any one of embodiments 1 to 36 and bringing said C1 compound in contact with a catalyst comprising said oxidic material.

67. A method for selectively catalytically reducing nitrogen oxides in an exhaust gas stream, preferably an exhaust gas stream from a diesel engine, said method comprising bringing said exhaust gas stream in contact with a catalyst comprising the oxidic material according to any one of embodiments 43 to 57.

68. The method of embodiment 67, wherein the oxidic material is the oxidic material according to embodiment 44 or any one of embodiments 54 to 57.

69. A method for selectively catalytically reducing nitrogen oxides in an exhaust gas stream, preferably an exhaust gas stream from a diesel engine, said method comprising preparing an oxidic material comprising a zeolitic material having framework type AEI and having a framework structure which comprises a tetravalent element Y, a trivalent element X, and O by a process according to any one of embodiments 1 to 42, and bringing said exhaust gas stream in contact with a catalyst comprising said oxidic material.

70. Then method of embodiment 69, said method comprising preparing an oxidic material comprising a zeolitic material having framework type AEI and having a framework structure, a tetravalent element Y, a trivalent element X, and O by a process according to any one of embodiments 37 to 42 and bringing said exhaust gas stream in contact with a catalyst comprising said oxidic material.
71. A catalyst, preferably a catalyst for selectively catalytically reducing nitrogen oxides in an exhaust gas stream, preferably an exhaust gas stream from a diesel engine, or for catalytically converting a C1 compound to one or more olefins, preferably converting methanol to one or more olefins or converting a synthetic gas comprising carbon monoxide and hydrogen to one or more olefins, said catalyst comprising the oxidic material according to any one of embodiments 43 to 57.

The present invention is further illustrated by the following reference examples, comparative examples, and examples.

EXAMPLES

Reference Example 1.1: Determination of the Crystallinity

The crystallinity of the zeolitic materials according to the present invention was determined by XRD analysis. X-ray powder diffraction (XRD) patterns were measured with a Rigaku Ultimate VI X-ray diffractometer (40 kV, 40 mA) using CuKalpha (lambda=1.5406 Angstrom) radiation. The angular range of 2° to 70° (2 theta) was scanned with a step size of 0.02°, while the divergence slit was set to a constant opening angle of 0.1°. The quantification of the crystalline content was performed using DI FFRAC.TOPAS V5 software, based on the crystal structures. This was refined to fit the data. Included in the model were also a linear background, Lorentz and polarization corrections, lattice parameters, space group and crystallite size. The quantification of the amorphous versus crystalline content was performed using DIFFRAC.EVA as described in the user manual.
1. User Manual DIFFRAC.TOPAS V5, 2014, Bruker AXS GmbH, Karlsruhe, Germany
2. User Manual DIFFRAC.EVA, 2014, Bruker AXS GmbH, Karlsruhe, Germany Reference Example 1.2: Determination of the BET Specific Surface Area The BET specific surface area was determined according to ISO 9277, second edition 2010, via nitrogen physisorption at 77 K.

Reference Example 1.3: Determination of the XRD Patterns

X-ray powder diffraction (XRD) patterns were measured with Rigaku Ultimate VI X-ray diffractometer (40 kV, 40 mA) using Cu(Kalpha) radiation (lambda=1.5406 Angstrom).

Reference Example 1.4: Scanning Electron Microscopy

Scanning electron microscopy (SEM) experiments were performed on a Hitachi SU-8010 electron microscope.

Reference Example 1.5: Temperature-Programmed-Desorption of Ammonia ($NH_3$-TPD)

The acidity of the catalysts was measured by the temperature-programmed-desorption of ammonia ($NH_3$-TPD).

The catalyst was prepared at 450° C. in a He flow for 60 min, followed by the adsorption of $NH_3$ at 100° C. for 1 h. After saturation, the catalyst was purged by He flow for 3 h to remove the physically adsorbed ammonia on the sample. Then, desorption of $NH_3$ was carried out from 100 to 600° C. with a heating rate of 5° C./min. The amount of $NH_3$ desorbed from the sample was detected by a thermal conductivity detector.

Comparative Example 1: Interzeolitic Transformation of Zeolite Y to Zeolitic Material Having Framework Type AEI a) Preparation of a Zeolitic Material Having Framework Type AEI Materials Used:

| | |
|---|---|
| USY zeolite ($SiO_2/Al_2O_3$ = 26, commercial material from Qilu Huaxin Industry) | 1.0 g |
| Deionized water | 0.0 g |
| DMPOH solution (according to example 1 a) above; 0.23M in water | 10.0 g |
| Sodium hydroxide (NaOH, AR, 96%, Sinopharm Chemical Reagent Co., Ltd.) | 0.24 g |

USY zeolite, deionized water, DMPOH solution, and the sodium hydroxide were mixed to provide a synthesis mixture with the following molar composition:
1.0 $SiO_2$:0.046 $Al_2O_3$:0.17 $Na_2O$:0.14 DMPOH:30 $H_2O$ Said synthesis mixture was transferred into a Teflon-lined autoclave oven and crystallized at 140° C. for 3 days. After filtering, washing, drying, and calcining at 550° C. for 4 h, the product was obtained, which was designated as a zeolitic material having framework type AEI, as shown by XRD analysis.

b) Preparing the H Form of the Zeolitic Material Having Framework Type AEI Prepared in a)

The zeolitic material prepared in a) was (i) ion-exchanged with 1 M $NH_4NO_3$ solution ($NH_4NO_3$, AR, 99%, Beijing Chemical Reagent Co., Ltd.). Using a nutsch-type filter, the filter cake was then washed nitrate-free with deionized water. Said ammonium nitrate treatment (i) was then repeated once. The resulting filter cake was dried, then calcined at 550° C. for 4 h. The $NH_3$-TPD curve, determined as described in Reference Example 1.5 is shown in FIG. 1.

Example 1: Preparation of a Zeolitic Material Having Framework Type AEI According to the Invention a) Providing the N,N-diethyl-cis-2,6-dimethylpiperidinium hydroxide (DMPOH)

Materials Used:

| | |
|---|---|
| cis-2,6-dimethylpiperidine (Sigma-Aldrich Reagent Co., Ltd.) | 40 g |
| Iodoethane (99%, Aladdin Chemical Co., Ltd.) | 222 g |
| Potassium bicarbonate ($KHCO_3$, AR, 99.5%, Sinopharm Chemical Reagent Co., Ltd.) | 71 g |
| Methanol (Sinopharm Chemical Reagent Co., Ltd.) | 110 g |
| Diethyl ether (AR, 99.5%, Sinopharm Chemical Reagent Co., Ltd.) | 1,000 g |

-continued

| | |
|---|---|
| Anion-exchange resin (Amberlite IRN-78, OH-form, Thermofisher) | 300 g |

N,N-diethyl-cis-2,6-dimethylpiperidine iodide was synthesized by reacting cis-2,6-dimethylpiperidine, iodoethane, and an excess of $KHCO_3$ in the presence of methanol solvent, followed by refluxing at 70° C. for 4 days. The $KHCO_3$ was filtered and then the solvent and the excess of iodoethane was removed by rotary evaporation. The product was washed with ether. The molecular structure was verified using $^1H$ and $^{13}C$ nuclear magnetic resonance (NMR). The product was converted from the iodide form to the hydroxide form (denoted as DMPOH) using an anion exchange resin.

b) Preparation of a Zeolitic Material Having Framework Type AEI

Materials Used:

| | |
|---|---|
| Sodium aluminate ($NaAlO_2$, AR, 99%, Sinopharm Chemical Reagent Co., Ltd.) | 0.038 g |
| Deionized water | 4.4 g |
| DMPOH solution (according to a) above; 0.23M in water | 10 g |
| Sodium hydroxide (NaOH, AR, 96%, Sinopharm Chemical Reagent Co., Ltd.) | 0.55 g |
| Colloidal silica (40 weight-% $SiO_2$ in water, Sigma-Aldrich Reagent Co., Ltd.) | 2.95 g |
| AEI seeds (prepared according to Comparative Example 1 hereinabove) | 0.02 g |

$NaAlO_2$ was dissolved in deionized water and the DMPOH solution was then added. After stirring at room temperature for 2 h, NaOH was introduced, followed by addition of the colloidal silica and the AEI seeds. This provided a synthesis mixture with the following molar composition:

1.0 $SiO_2$:0.0083 $Al_2O_3$:0.35 $Na_2O$:0.12 DMPOH:44 $H_2O$: 0.017 AEI zeolite seeds The ratio of $SiO_2$:$Al_2O_3$ was 120:1. After stirring for 10 min at room temperature, said synthesis mixture was transferred into a Teflon-lined autoclave oven and crystallized at 140° C. for 3 days. After filtering, washing, drying, and calcining at 550° C. for 4 h, the product was obtained, which was designated as a zeolitic material having framework type AE, as shown by XRD analysis.

c) Preparing the H Form of the Zeolitic Material Having Framework Type AEI Prepared in b)

Figure 2:
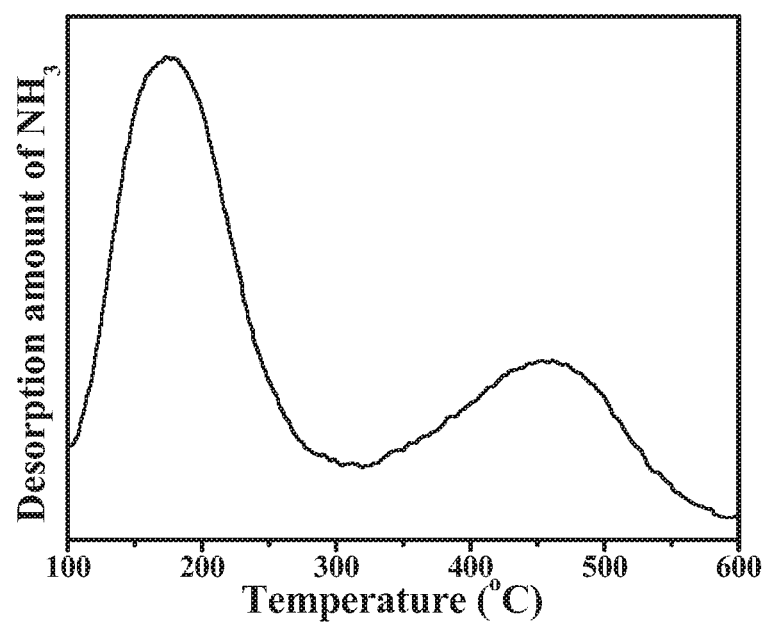

The zeolitic material prepared in b) was (i) ion-exchanged with a 1 M $NH_4NO_3$ solution treatment. Using a nutsch-type filter, the filter cake was washed nitrate-free with deionized water. Said $NH_4NO_3$ solution treatment (i) was then repeated once. The resulting filter cake was dried, then calcined at 550° C. for 4 h. The $NH_3$-TPD curve, determined as described in Reference Example 1.5 is shown in FIG. 2. As one can see, the $NH_3$-TPD curve exhibits two peaks centered at about 175° C. and 460° C. Notably, this is different from the $NH_3$-TPD curve obtained for Comparative Example 1 (see above), which may evidence a structural difference between the zeolitic materials of Example 1 and Comparative Example 1.

Example 2: Preparation of a Zeolitic Material Having Framework Type AEI Under Various Conditions The protocol of Example 1 was repeated, except for the following changes outlined in Table 1:

TABLE 1

Synthesis of AEI zeolite under various conditions

| Run[a] | $SiO_2/Al_2O_3$ | $Na_2O/SiO_2$ | Products[b] | Si/Al of the product |
|---|---|---|---|---|
| 1 | 20 | 0.22 | MOR | n.d. |
| 2 | 20 | 0.35 | MOR | n.d. |
| 3 | 40 | 0.22 | Amorphous | n.d. |
| 4 | 40 | 0.28 | AEI + MOR | n.d. |
| 5 | 40 | 0.35 | AEI + ANA | n.d. |
| 6 | 60 | 0.31 | AEI | 6.4 |
| 7 | 80 | 0.35 | AEI | 8.4 |
| 8 | 120 | 0.32 | AEI + MOR | n.d. |
| 9 | 120 | 0.40 | AEI + ANA | n.d. |
| 10 | 240 | 0.35 | AEI | 8.1 |
| 11 | 480 | 0.35 | AEI | 8.0 |

Figure 3:
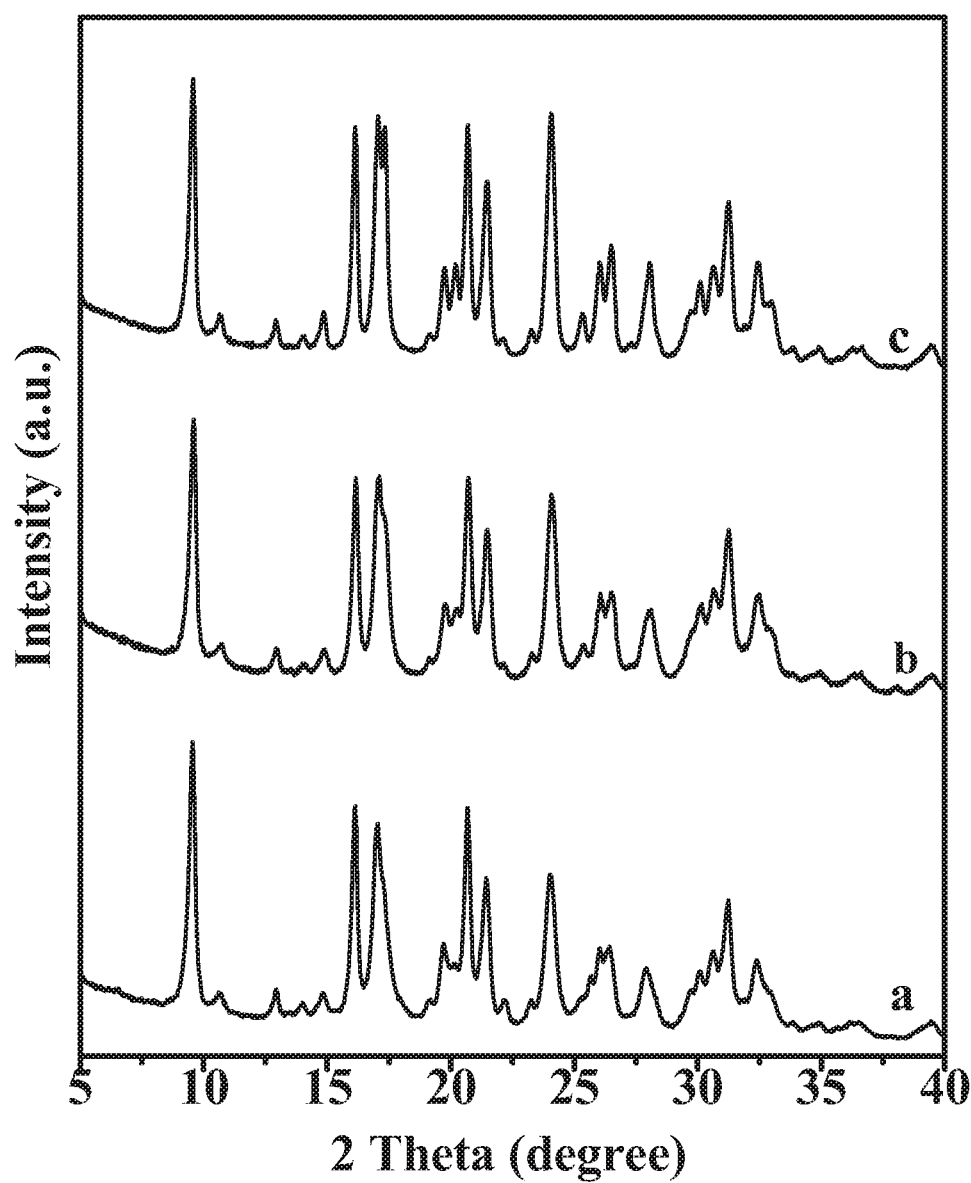

[a]Crystallized at 140° C. for 3 days, $DMPOH/SiO_2$ = 0.12:1, $H_2O/SiO_2$ = 44.3:1, $Seeds/SiO_2$ = 0.017:1
[b]The zeolite phase appearing first, i.e. AEI, is dominant As one can see from Table 1, by adjusting the $SiO_2/Al_2O_3$ ratio and $Na_2O/SiO_2$ ratio one may control the selectivity for the desired zeolitic material having framework type AEI. In this light, when a $SiO_2/Al_2O_3$ ratio greater than 30:1 and a $Na_2O/SiO_2$ ratio of greater than 0.23:1 is employed, a zeolitic material having framework type AEI may selectively be produced. The XRD pattern determined as described in Reference Example 1.3, for the zeolitic material having framework type AEI for runs 6, 11 and 12 is shown in FIG. 3.

Figure 4:
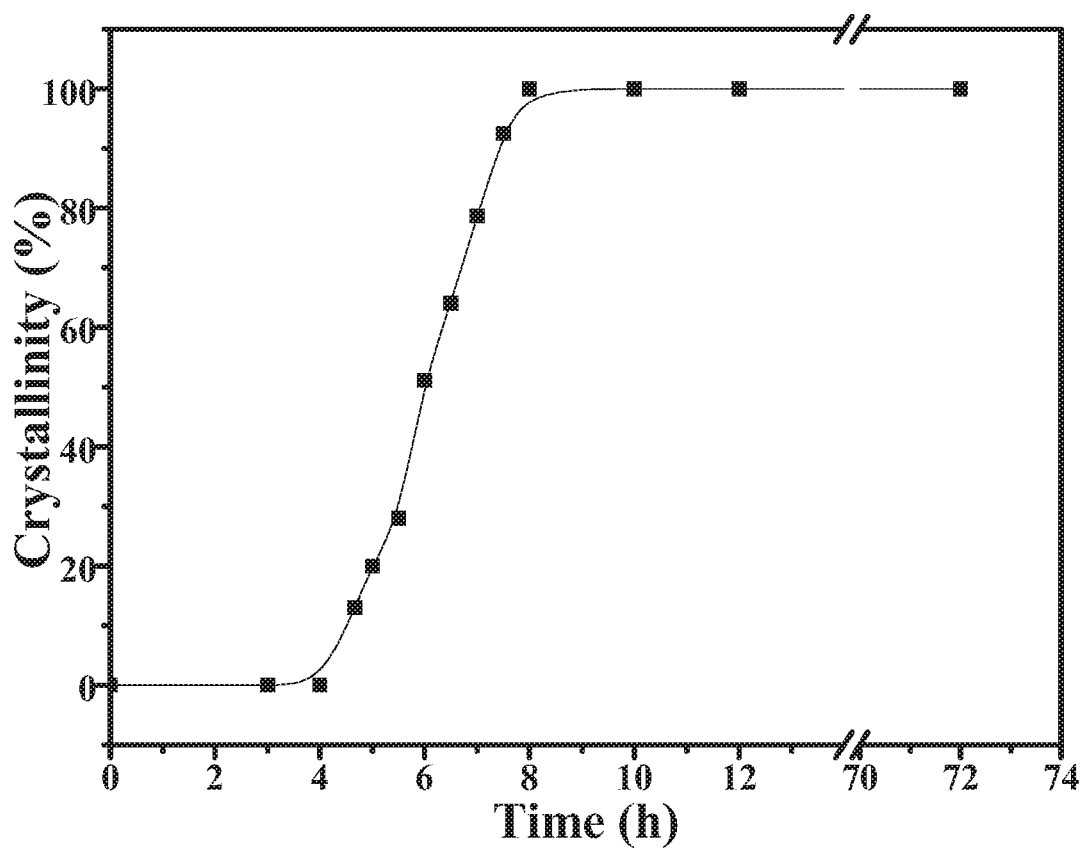
Figure 5:
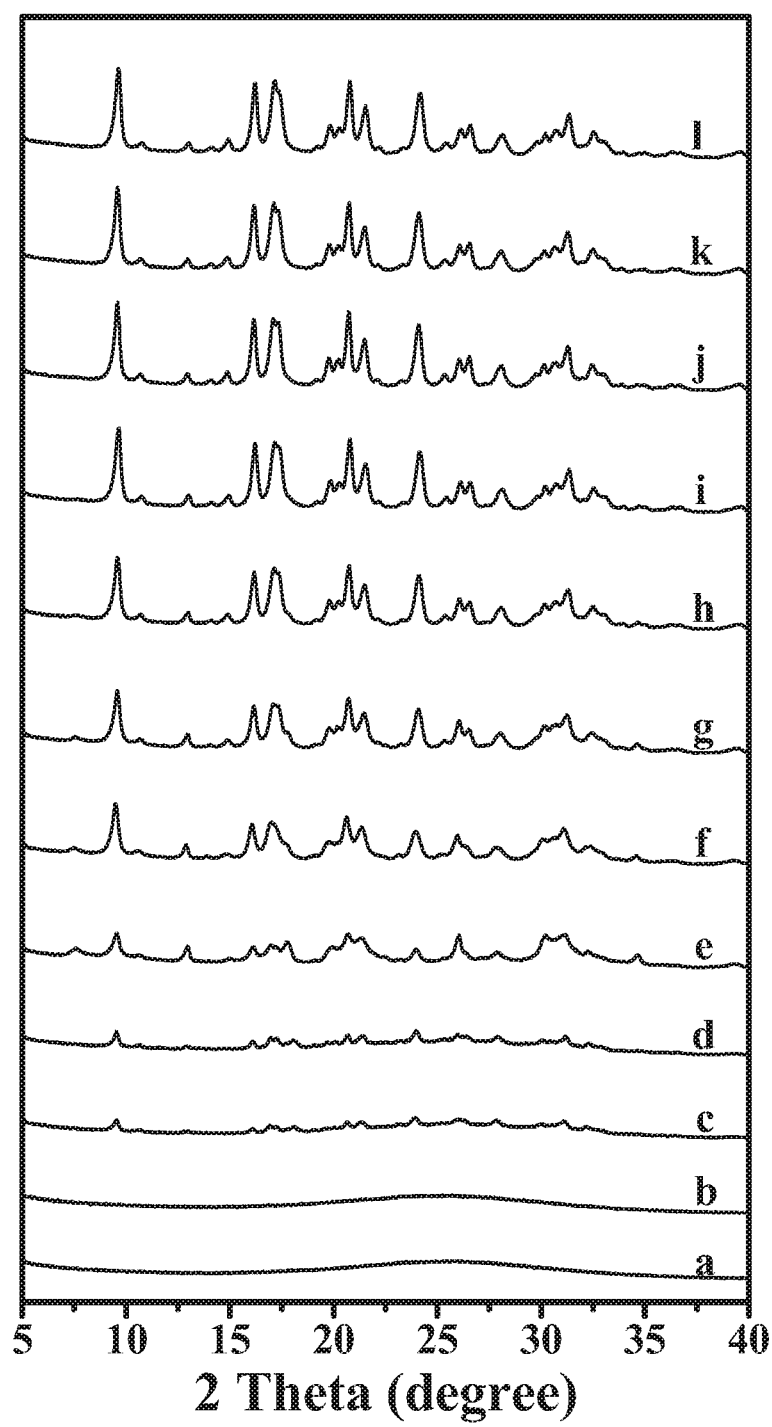
Figure 6:
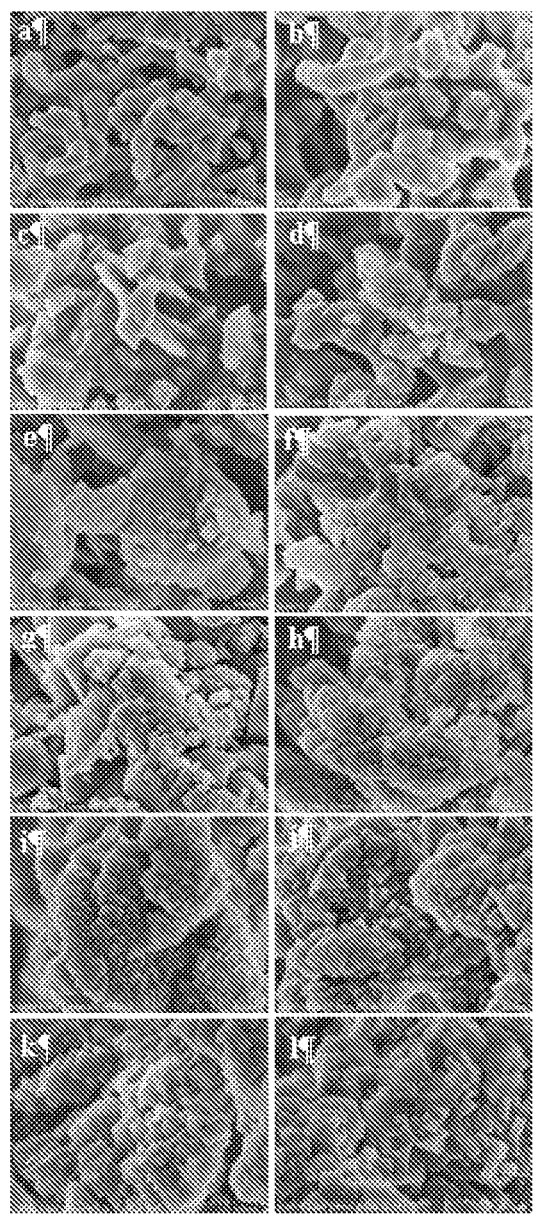

Example 3: Preparation of a Zeolitic Material Having Framework Type AEI with Varied Crystallization Time The protocol of Example 1 was repeated, except that the crystallization time was varied over the following times in hours (a) 0, (b) 4, (c) 4.75, (d) 5, (e) 5.5, (f) 6, (g) 6.5, (h) 7, (i) 7.5, (j) 8, (k) 10, and (l) 72 h, respectively. It was found that by increasing the crystallization time from 5 to 8 hours the AEI zeolite product crystallinity continually increases. After 8 hours a pure phase, of AEI zeolite was prepared with high crystallinity. After 8 hours the crystallinity does not change, thus the crystallization appears to be finished after 8 hours. In this light, the dependence of the zeolitic material having framework type AEI crystallinity on crystallization time is shown in FIG. 4. The XRD patterns determined as described in Reference Example 1.3, are shown in FIG. 5. The SEM pictures, determined as described in Reference Example 1.4, are shown in FIG. 6.

Example 4: Preparation of Zeolitic Materials Having Framework Type AEI and Comprising a Metal M (Cu)

Each of the AEI zeolitic materials obtained from Example 1 c) and Comparative Example 1 b) was ion exchanged using a 0.1 M $Cu(NO_3)_2$ $H_2O$ solution (Sinopharm Chemical Reagent Co., Ltd.) to obtain a copper loading of about 2.4 weight-%, followed by calcination at 550° C. for 4 h (the obtained materials referred to herein after as Cu-Ex. 1) and Cu-Comparative Ex. 1). For the subsequent tests, respectively fresh and aged Cu containing materials were used. For aging purposes, a hydrothermal treatment was then carried out at 750° C. with 10% $H_2O$ for 16 hours.

Figure 7:
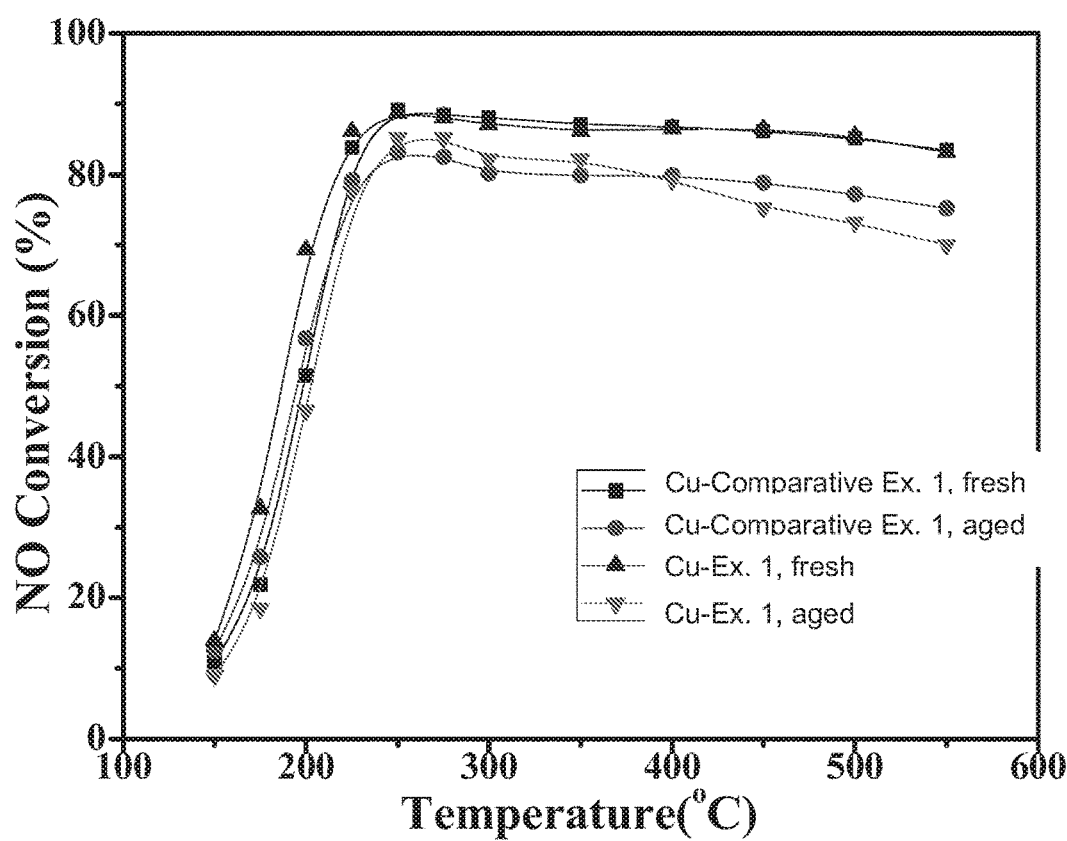

Example 5 Use of the Zeolitic Material Having Framework Type AEI for Selectively Catalytically Reducing Nitrogen Oxides The zeolitic materials obtained from Example 4 were subjected to a selective catalytic reduction test. Catalytic activities in selective catalytic reduction of ammonia ($NH_3$-SCR) were measured in a fixed-bed quartz reactor in a gaseous mixture containing 500 ppm of NO, 500 ppm of $NH_3$, 10% of $O_2$, and $N_2$ as a balance gas. The gas hourly space velocity (GHSV) was 400 000 $h^{-1}$. The results obtained are shown in FIG. 7. As one can see from the catalytic reduction tests, all catalysts tested exhibited similar excellent catalytic performances and hydrothermal stability.

SHORT DESCRIPTION OF THE FIGURES

FIG. 1: shows the $NH_3$-TPD curve according to Comparative Example 1 b).

FIG. 2: shows the $NH_3$-TPD curve according to Example 1 c).

FIG. 3: shows the XRD pattern of the zeolitic material according to Example 2, Table 1, runs 6, 11 and 12 (a, b and c, respectively).

FIG. 4: shows the dependence of the crystallinity of the zeolitic material according to Example 3 on the crystallization time (determined according Reference Example 1.1).

FIG. 5: shows the XRD pattern of the zeolitic material according to Example 3, crystallized at (a) 0, (b) 4, (c) 4.75, (d) 5, (e) 5.5, (f) 6, (g) 6.5, (h) 7, (i) 7.5, (j) 8, (k) 10, and (l) 72 h, respectively (determined according Reference Example 1.3).

FIG. 6: shows the SEM pictures of the zeolitic material according to Example 3, crystallized at (a) 0, (b) 4, (c) 4.75, (d) 5, (e) 5.5, (f) 6, (g) 6.5, (h) 7, (i) 7.5, (j) 8, (k) 10, and (l) 72 h, respectively (determined according Reference Example 1.4).

FIG. 7: shows the results obtained from the selective catalytic reduction testing of Example 5.

Cited Literature
WO 2016/080547 A1

What is claimed is:

1. A process for preparing an oxidic material comprising a zeolitic material having framework AEI and a framework structure comprising a tetravalent element Y, a trivalent element X, and O, the process comprising:
   (i) preparing a synthesis mixture comprising water, a source of Y, a source of X comprising sodium, an AEI framework structure directing agent, and a source of sodium other than the source of X;
   (ii) heating the synthesis mixture obtained from (i) to a temperature in the range of from 100 to 180° C. and keeping the synthesis mixture under autogenous pressure at a temperature in this range for a time in the range of at least 6 hrs, obtaining the oxidic material comprising a zeolitic material having framework AEI and a framework structure comprising a tetravalent element Y, a trivalent element X, and O, comprised in its mother liquor;
   (iii) cooling the mixture obtained from (ii) to a temperature in the range of 10 to 50° C.; and
   (iv) separating the oxidic material comprising a zeolitic material from the mixture obtained from (ii), said separating comprising:
   (iv.1) subjecting the mixture obtained from (ii) to a solid-liquid separation method comprising a filtration method or a spraying method,
   wherein the process for preparing the oxidic material does not comprise an addition of a source of X comprising sodium other than the step of (i) preparing the synthesis mixture comprising water, a source of Y, a source of X comprising sodium, and AEI framework structure directing agent, and a source of sodium other than the source of X,
   wherein the AEI framework structure directing agent according to (i) comprises an N,N—($C_1$-$C_3$)dialkyl-($C_1$-$C_3$)dialkylpiperidinium cation;
   wherein in the synthesis mixture prepared in (i) which is subjected to (ii), the molar ratio of the source of Y calculated as $YO_2$, relative to the source of X calculated as $X_2O_3$, defined as $YO_2:X_2O_3$, is in the range from 40:1 to 500:1;
   wherein in the synthesis mixture prepared in (i) which is subjected to (ii), the molar ratio of sodium calculated as $Na_2O$, relative to the source of Y calculated as $YO_2$, defined as $Na_2O:YO_2$, is in the range of from 0.25:1 to 0.50:1; and
   wherein the synthesis mixture prepared in (i) is heated to the temperature in (ii) with a heating rate in the range of from 0.5 to 4 K/min;
   wherein Y comprises a colloidal silica;
   wherein X is Al;
   wherein the source of X comprises $NaAlO_2$, and
   wherein the source of sodium other than the source of X comprises NaOH.

2. The process of claim 1, wherein the N,N-dialkyl-dialkylpiperidinium cation comprises an N,N—($C_1$-$C_2$)dialkyl-($C_1$-$C_2$)dialkylpiperidinium cations, or
   wherein the N,N-dialkyl-dialkylpiperidinium cation is selected from the group consisting of an N,N—($C_1$-$C_2$)dialkyl-2,6-($C_1$-$C_2$)dialkylpiperidinium cation, an N,N—($C_1$-$C_2$)dialkyl-3,5-($C_1$-$C_2$)dialkylpiperidinium cation and a mixture of two or more thereof, or
   wherein the N,N-dialkyl-dialkylpiperidinium cation is selected from the group consisting of an N,N-dimethyl-2,6-($C_1$-$C_2$)dialkylpiperidinium cation, an N,N-dimethyl-3,5-($C_1$-$C_2$)dialkyl-piperidinium cation and a mixture of two or more thereof, or
   wherein the N,N-dialkyl-dialkylpiperidinium cation is selected from the group consisting of N,N-diethyl-2,6-dimethylpiperidinium cation, N,N-diethyl-3,5-dimethylpiperidinium cation and a mixture thereof, or
   wherein the N,N-dialkyl-dialkylpiperidinium cation comprises N,N-diethyl-cis-2,6-dimethylpiperidinium cation;
   wherein the AEI framework structure directing agent according to (i) is one or more of a salt, a hydroxide or a halide, wherein the halide is one or more of an iodide, a chloride, a fluoride or a bromide, or wherein the AEI framework structure directing agent according to (i) comprises a hydroxide;
   wherein the AEI framework structure directing agent according to (i) comprises N,N-diethyl-2,6-dimethylpiperidinium hydroxide or N,N-diethyl-cis-2,6-dimethylpiperidinium hydroxide.

3. The process of claim 1, wherein in the synthesis mixture prepared in (i) which is subjected to (ii),
   the molar ratio of the source of Y calculated as $YO_2$, relative to the water, defined as $YO2$: water, is in the range of from 0.01:1 to 1:1;

wherein the synthesis mixture prepared in (i) which is subjected to (ii) further comprises a crystalline seed material comprising a zeolitic material having framework AEI and a framework structure comprising the tetravalent element Y, the trivalent element X, and O.

4. The process of claim 1, wherein the temperature according to (ii) is in the range of from 120 to 160° C., wherein according to (ii), the synthesis mixture is kept at the temperature for a time in the range of from 6 to 12 hrs.

5. The process of claim 1, further comprising
(vi) subjecting the oxidic material comprising a zeolitic material obtained from (iv) to ion exchange conditions, obtaining an oxidic material comprising a zeolitic material having framework AEI in its ammonium form.

6. The process of claim 5, wherein the ion exchange conditions are ammonium exchange conditions, and the process further comprises bringing a solution comprising ammonium ions in contact with the oxidic material comprising the zeolitic material obtained from (iv).

7. The process of claim 6, wherein bringing the solution in contact with the oxidic material comprises impregnating the zeolitic material with the solution, or spraying the solution onto the oxidic material.

8. The process of claim 7, further comprising (vii) calcining the oxidic material in a gas atmosphere at a temperature of 300 to 700° C., and obtaining an oxidic material comprising the zeolitic material in its H form.

9. The process of claim 1, further comprising
(viii) supporting a metal M on the zeolitic material comprised in the oxidic material.

10. The process of claim 1, wherein the source of X is free of NaOH.

11. The process of claim 1, wherein (ii) is carried out in an autoclave.

12. The process of claim 1, wherein the temperature according to (ii) is in the range of 120 to 160° C., or 130 to 150° C.

13. The process of claim 1, wherein (iv) further comprises:
(iv.2) washing the oxidic material comprising the zeolitic material obtained from (iv.1); and
(iv.3) drying the oxidic material comprising the zeolitic material obtained from (iv.1) or (iv.2) in a gas atmosphere having a temperature in the range of from 80 to 170° C.

14. The process of claim 13, wherein the gas atmosphere in (iv.3) comprises oxygen, optionally, wherein the gas atmosphere comprises air, lean air, or synthetic air.

15. The process of claim 1, further comprising (v) calcining the oxidic material comprising a zeolitic material obtained from (iv) in a gas atmosphere having a temperature in the range of 400 to 600° C., wherein at least a portion of the mother liquor obtained according to (iv.1) from separating the oxidic material from the mixture obtained from (ii) is recycled to (i) as part of the synthesis mixture prepared in (i).

16. The process of claim 15, wherein the gas atmosphere in (v) comprises oxygen, optionally, wherein the gas atmosphere comprises air, lean air, or synthetic air.

17. The process of claim 1, wherein the oxidic material exhibits a temperature programmed desorption of ammonia ($NH_3$-TPD) curve exhibiting a peak having its maximum at $(460\pm15)$ ° C., and a further peak having its maximum at $(175\pm15)$ ° C.

18. The process of claim 1, wherein the oxidic material exhibits a BET specific surface area in the range of 550 to 700 m$^2$/g.

19. The process of claim 1, wherein the oxidic material further comprises iron, cobalt, nickel, copper, and zinc each independently in an amount of about 0.1 wt % to about 15 wt % calculated as a metal oxide and based on the total weight of the oxidic material.

* * * * *